United States Patent
Yoshii (10) Patent No.: US 11,437,619 B2
(45) Date of Patent: Sep. 6, 2022

(54) SECONDARY BATTERY, INSULATING MEMBER AND POSITIVE ELECTRODE LEAD

(71) Applicant: Panasonic Intellectual Property Management Co., Ltd., Osaka (JP)

(72) Inventor: Kazuhiro Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/878,906

(22) Filed: May 20, 2020

(65) Prior Publication Data

US 2020/0280071 A1    Sep. 3, 2020

Related U.S. Application Data

(63) Continuation of application No. PCT/JP2018/040428, filed on Oct. 31, 2018.

(30) Foreign Application Priority Data

Dec. 5, 2017 (JP) .............................. JP2017-233737
Dec. 6, 2017 (JP) .............................. JP2017-234057

(51) Int. Cl.
*H01M 4/46* (2006.01)
*H01M 50/46* (2021.01)
(Continued)

(52) U.S. Cl.
CPC ......... *H01M 4/5825* (2013.01); *H01M 4/463* (2013.01); *H01M 4/621* (2013.01);
(Continued)

(58) Field of Classification Search
CPC ........ H01M 50/54; H01M 50/56; H01M 4/58; H01M 4/62
See application file for complete search history.

(56) References Cited

U.S. PATENT DOCUMENTS 4,520,085 A * 5/1985 Wyser .................... H01M 6/12
429/174
2009/0169986 A1* 7/2009 Fukunaga ......... H01M 10/0436
156/256
(Continued)

FOREIGN PATENT DOCUMENTS

JP          9-134729 A       5/1997
JP        2004-311282 A     11/2004
(Continued)

OTHER PUBLICATIONS

International Search Report dated Jan. 22, 2019, issued in counterpart International Application No. PCT/JP2018/040428, with English Translation. (1 page).
(Continued)

*Primary Examiner* — Kenneth J Douyette
(74) *Attorney, Agent, or Firm* — WHDA, LLP (57) ABSTRACT

A secondary battery according to one embodiment of the present disclosure comprises a positive electrode, a negative electrode, a positive electrode lead that is electrically connected to the positive electrode, and an insulating tape that covers a part of the positive electrode lead. The positive electrode lead has: one end part which is connected to an exposed part of a positive electrode collector that constitutes the positive electrode; and an extension part which extends outwardly from the one end part beyond the periphery of the positive electrode collector. An insulating layer is arranged on the outer surface of the one end part of the positive electrode lead; and the insulating layer is covered by the insulating tape.

17 Claims, 7 Drawing Sheets

(51) Int. Cl.
*H01M 50/54* (2021.01)
*H01M 4/58* (2010.01)
*H01M 4/62* (2006.01)
*H01M 4/02* (2006.01)

(52) U.S. Cl.
CPC .......... *H01M 50/46* (2021.01); *H01M 50/54* (2021.01); *H01M 2004/027* (2013.01); *H01M 2004/028* (2013.01)

(56) References Cited

U.S. PATENT DOCUMENTS

| | | | |
|---|---|---|---|
| 2009/0263712 A1* | 10/2009 | Mizuta | H01M 10/0436 429/177 |
| 2012/0196172 A1* | 8/2012 | Maeda | H01M 4/667 29/623.5 |
| 2012/0202105 A1 | 8/2012 | Shinyashiki et al. | |
| 2014/0120408 A1 | 5/2014 | Kim et al. | |
| 2014/0120417 A1 | 5/2014 | Matsushita et al. | |
| 2016/0043375 A1* | 2/2016 | Saitoh | H01M 10/0562 429/152 |
| 2016/0111728 A1* | 4/2016 | Ohta | H01M 4/0404 429/246 |
| 2017/0317390 A1 | 11/2017 | Sato | |
| 2018/0375083 A1 | 12/2018 | Takahashi et al. | |
| 2019/0097228 A1 | 3/2019 | Kobayashi | |

FOREIGN PATENT DOCUMENTS

| | | |
|---|---|---|
| JP | 2007-95423 A | 4/2007 |
| JP | 2010-055906 A | 3/2010 |
| JP | 2012-164470 A | 8/2012 |
| JP | 2014-89856 A | 5/2014 |
| JP | 2014-135169 A | 7/2014 |
| KR | 10-2019-0071317 A | 6/2019 |
| WO | 2016/067706 A1 | 5/2016 |
| WO | 2017/149961 A1 | 9/2017 |
| WO | 2017/163933 A1 | 9/2017 |

OTHER PUBLICATIONS

Extended European Search Report dated Dec. 23, 2020 for the related European Patent Application No. 18886503.4.

* cited by examiner

SECONDARY BATTERY, INSULATING MEMBER AND POSITIVE ELECTRODE LEAD

TECHNICAL FIELD

The present invention relates to a secondary battery, an insulating member, and a positive electrode lead.

BACKGROUND ART

Conventionally, a lithium secondary battery in which insulation properties of a positive electrode or a negative electrode are improved by using an insulating tape has been proposed.

PATENT LITERATURE 1 describes a lithium secondary battery in which disconnection of a current collector at a part at which the current collector and a lead are in contact with each other is suppressed.

Figure 7:
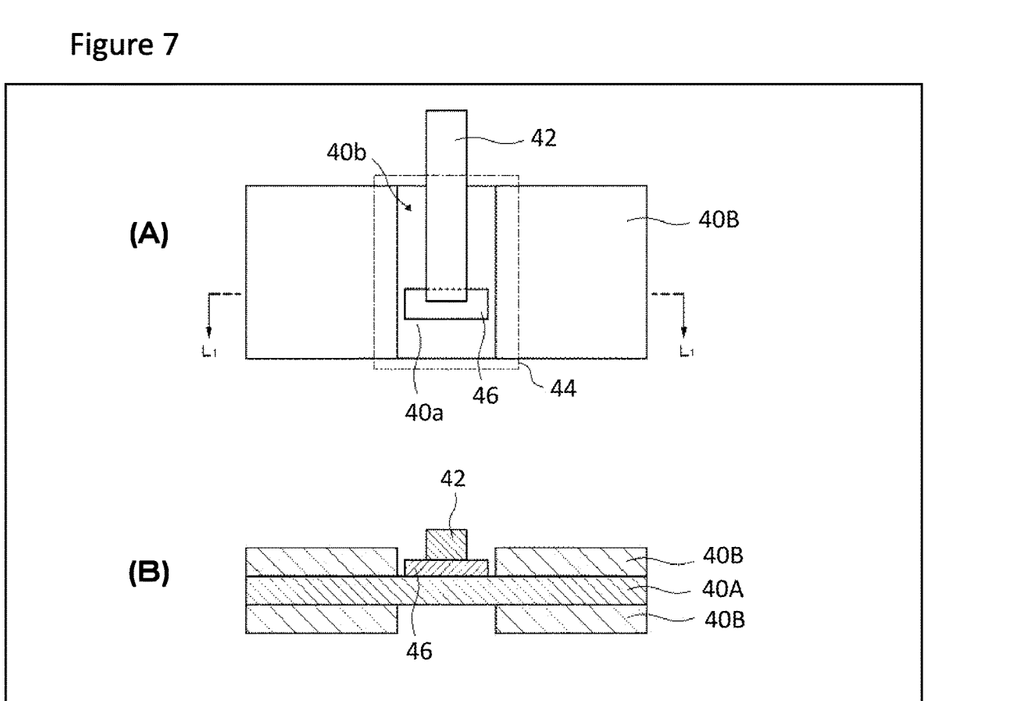
FIG. 7 is a configurational diagram of a positive electrode of a lithium secondary battery described in PATENT LITERATURE 1.

FIG. 7 is a configurational diagram of a positive electrode of the lithium secondary battery described in PATENT LITERATURE 1, FIG. 7(A) is a partial top view viewed from a one principal surface-side of the current collector, and FIG. 7(B) is a sectional view taken along the line L1-L1 in FIG. 7(A).

As shown in FIG. 7, an insulating tape 44 disposed at the one principal surface-side of a positive electrode current collector 40A covers a positive electrode current collector exposed surface 40a at a both-surface non-coated portion 40b on which no positive electrode mixture layer 40B is formed, a positive electrode lead 42 above the positive electrode current collector exposed surface 40a, and a protective layer 46 interposed between a lower end part of the positive electrode lead 42 and the positive electrode current collector exposed surface 40a. This insulating tape 44 is provided to prevent heat generation in a battery when a separator or the like splits at the time of battery abnormality and the positive electrode and a negative electrode come into contact with each other, for example.

CITATION LIST

Patent Literature

PATENT LITERATURE 1: Japanese Unexamined Patent Application Publication No. 2014-89856

SUMMARY

However, when a foreign matter adheres onto the insulating tape 44 covering the positive electrode lead 42 and the insulating tape 44 breaks due to the foreign matter or the like, an internal short circuit occurs between the positive electrode lead 42 and the negative electrode, for example, which may lead to an increase in battery temperature.

An object of the present disclosure is to provide a secondary battery, an insulating member, and a positive electrode lead capable of suppressing an increase in battery temperature when an insulating tape covering a positive electrode lead breaks due to a foreign matter.

A secondary battery according to one aspect of the present disclosure is a secondary battery having: a positive electrode; a negative electrode; a battery case housing the positive electrode and the negative electrode; a positive electrode lead electrically connected to the positive electrode; and an insulating tape covering a part of the positive electrode lead. The positive electrode has a positive electrode current collector and a positive electrode active material layer formed on the positive electrode current collector. The positive electrode current collector has an exposed part on which no positive electrode active material layer is formed. The positive electrode lead has a first end part connected to the exposed part and an extension part extending from the first end part toward an outside of a peripheral part of the positive electrode current collector. An insulating layer is disposed on an outer surface of the first end part of the positive electrode lead, and the insulating layer is covered with an insulating tape.

An insulating member according to one aspect of the present disclosure is an insulating member covering a part of a positive electrode lead electrically connecting a battery case and a positive electrode, with the battery case housing the positive electrode and a negative electrode, the insulating member having: an insulating tape having a substrate layer mainly including an organic material and an adhesive layer provided on the substrate layer; and an insulating layer provided on the adhesive layer of the insulating tape.

A positive electrode lead according to the one aspect of the present disclosure has an insulating layer formed on a surface of the positive electrode lead According to the present disclosure, an increase in battery temperature which occurs when the insulating tape covering the positive electrode lead breaks due to a foreign matter may be suppressed.

DESCRIPTION OF EMBODIMENTS

Hereinafter, one example of a secondary battery which is one aspect of the present disclosure will be described. Figures referenced in the following description of embodiments are schematically illustrated, and dimension ratios or the like of components drawn in the figures may be different from actual ones.

Figure 1:
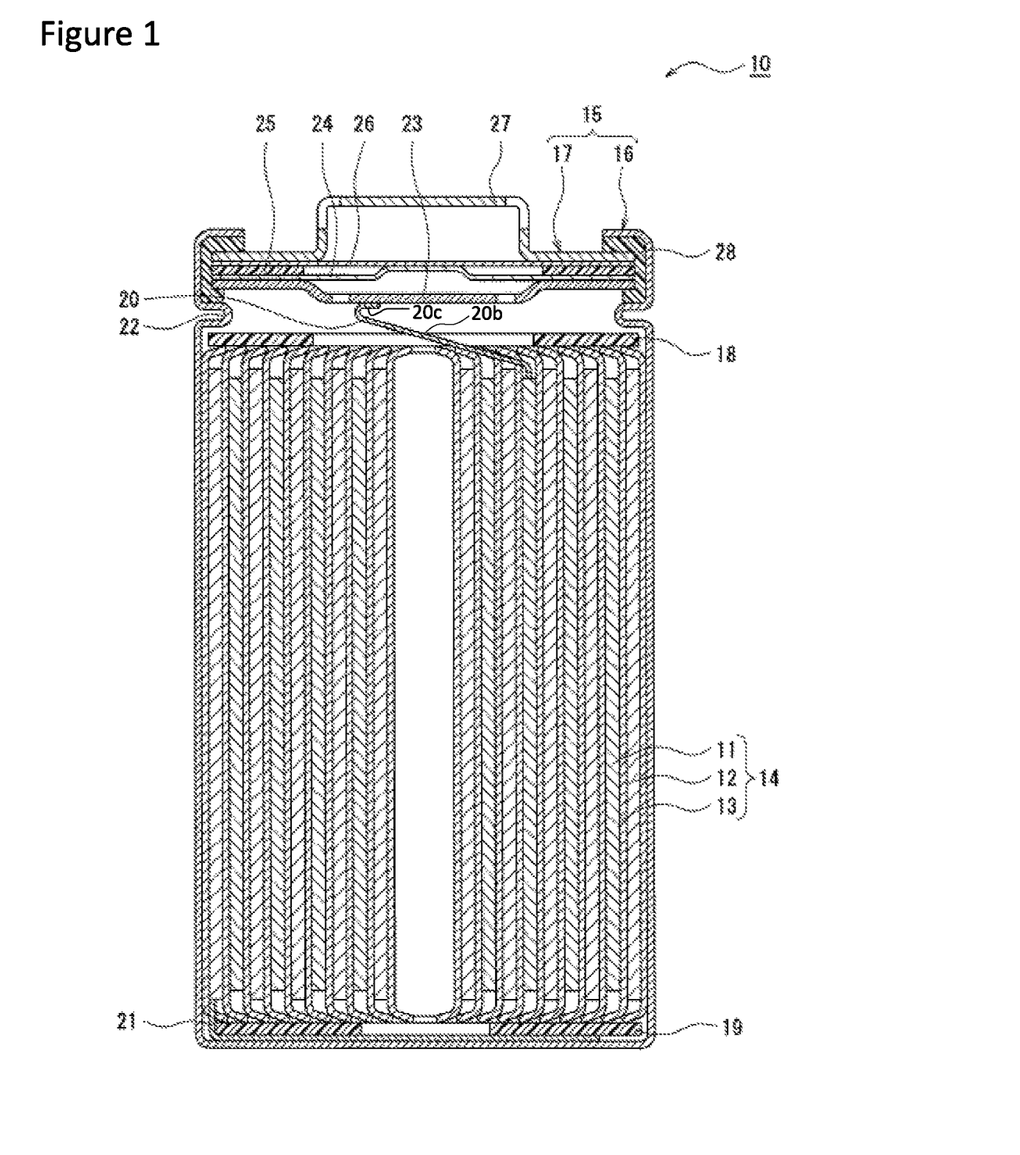
FIG. 1 is a sectional view of a secondary battery according to an embodiment.

FIG. 1 is a sectional view of a secondary battery according to an embodiment. The secondary battery 10 shown in FIG. 1 is one example of a lithium ion secondary battery. The secondary battery according to the embodiment is not limited to a lithium ion secondary battery and may be other secondary batteries such as an alkaline secondary battery.

The secondary battery 10 shown in FIG. 1 comprises a wound-type electrode assembly 14 in which a positive electrode 11 and a negative electrode 12 are wound with a separator 13 interposed therebetween, an electrolyte, insulating plates 18, 19 respectively disposed at the upper and lower sides of the electrode assembly 14, a positive electrode lead 20 and a negative electrode lead 21, an insulating tape (not shown) covering a part of the positive electrode lead 20, and a battery case 15 housing these members described above. Incidentally, the secondary battery 10 may comprise an insulating member covering the negative electrode lead 21.

The electrode assembly 14 is not limited to such a wound-type electrode assembly, and other forms such as a laminated-type electrode assembly in which a positive electrode and a negative electrode are alternately laminated with a separator interposed therebetween may be employed, for example.

The battery case 15 comprises a bottomed cylindrical case body 16 having an opening, and a sealing assembly 17 sealing the opening of the case body 16, for example. The battery case 15 desirably comprises a gasket 28 provided between the case body 16 and the sealing assembly 17, and sealability inside the battery is secured thereby. The shape of the battery case 15 is not limited to a cylindrical shape, and the battery case 15 may be a square shape, a laminate-type, and the like, for example.

The case body 16 has a projecting portion 22 in which a part of a side surface thereof inwardly projects and which supports the sealing assembly 17, for example. The projecting portion 22 is preferably formed into an annular shape along a circumferential direction of the case body 16 and supports the sealing assembly 17 with its upper surface.

The sealing assembly 17 has a structure in which a filter 23, a lower vent member 24, an insulator 25, an upper vent member 26, and a cap 27 are laminated from the side of the electrode assembly 14 in this order. Each member configuring the sealing assembly 17 has a disc shape or a ring shape, for example, and the members other than the insulator 25 are electrically connected to each other. The lower vent member 24 and the upper vent member 26 are connected to each other at their respective central parts, and the insulator 25 is interposed between respective peripheral parts of the lower vent member 24 and the upper vent member 26. When an inner pressure increases due to heat generated by an internal short circuit or the like, the lower vent member 24 deforms so as to push up the upper vent member 26 toward the side of the cap 27 and breaks, and a current path between the lower vent member 24 and the upper vent member 26 is cut off, for example. When the inner pressure further increases, the upper vent member 26 breaks, and gas is discharged from an opening of the cap 27.

The positive electrode lead 20 has a first end part (not shown), an extension part 20b, and a second end part 20c; the first end part is connected to the positive electrode 11; the extension part 20b extending from the first end part extends toward the sealing assembly 17 through a through hole of the insulating plate 18; and the second end part 20c positioned closer to a leading end than the extension part 20b is connected to a lower surface of the filter 23 of the sealing assembly 17 as described later. Consequently, the cap 27 electrically connected to the filter 23 becomes a positive electrode terminal. One end of the negative electrode lead 21 is connected to the negative electrode 12 and the other end of the negative electrode lead 21 is connected to an inner surface of a bottom part of the case body 16, with the negative electrode lead 21 extending from the negative electrode 12 through an outside of the insulating plate 19. Consequently, the case body 16 becomes a negative electrode terminal. Incidentally, each of the second end part of the positive electrode lead 20 and the other end of the negative electrode lead 21 may be connected at a position opposite to the above described position. For example, the second end part of the positive electrode lead 20 may be connected to the case body 16, and the other end of the negative electrode lead 21 may be connected to the lower surface of the filter 23 of the sealing assembly 17. Incidentally, while the positive electrode lead 20 of FIG. 1 has the second end part 20c to be connected to the battery case 15, in the case of a battery in which the battery case 15 is not connected (for example, a square battery, a laminated battery, and the like), the positive electrode lead 20 does not have the second end part 20c connected to the battery case 15.

Hereinafter, the positive electrode 11, the positive electrode lead 20, the negative electrode 12, the electrolyte, and the separator 13 will be described with reference to FIG. 1 and FIG. 2. The insulating tape 30 is illustrated by an alternate long and short dash line as a transmissive image in FIG. 2.

The positive electrode 11 comprises a positive electrode current collector 32 and a positive electrode active material layer 34 formed on the positive electrode current collector 32. Foil of a metal stable in an electric potential range of the positive electrode such as aluminum, a film in which said metal is disposed on a surface layer thereof, and the like are used for the positive electrode current collector 32. The positive electrode active material layer 34 includes a positive electrode active material. In addition, the positive electrode active material layer 34 preferably includes a conductive agent and a binder in addition to the positive electrode active material.

Examples of the positive electrode active material included in the positive electrode active material layer 34 include a lithium-transition metal composite oxide. Specifically, lithium cobaltate, lithium manganate, lithium nickelate, a lithium nickel manganese composite oxide, a lithium nickel cobalt composite oxide, and the like can be used as the positive electrode active material, and Al, Ti, Zr, Nb, B, W, Mg, Mo, and the like may be added to these lithium-transition metal composite oxides.

Examples of the conductive agent included in the positive electrode active material layer 34 include carbon powder such as carbon black, acetylene black, Ketjen black, and graphite. These conductive agents may be used singly, or two or more kinds thereof may be used in combination.

Examples of the binder included in the positive electrode active material layer 34 include a fluorine polymer and a rubber polymer. Examples of the fluorine polymer include polytetrafluoroethylene (PTFE), polyvinylidene fluoride (PVdF), and a modified product thereof, and examples of the rubber polymer include an ethylene-propylene-isoprene copolymer and an ethylene-propylene-butadiene copolymer. These binders may be used singly, or two or more kinds thereof may be used in combination.

The positive electrode current collector 32 has an exposed part 32a on which the positive electrode active material layer 34 is not formed. Incidentally, the exposed part 32a illustrated in FIG. 2 is formed at a longitudinally central part of the positive electrode current collector 32. Note that the exposed part 32a may be formed at any position of the positive electrode current collector 32 and may be formed at a longitudinally end part of the positive electrode current collector 32, for example.

The positive electrode lead 20 comprises a first end part 20a connected to the exposed part 32a of the positive electrode current collector 32, an extension part 20b extending from the first end part 20a toward an outside of a peripheral part 32b of the positive electrode current collector 32. In addition, although not shown in FIG. 2, the positive electrode lead 20 has the second end part 20c (see FIG. 1) in a leading end side of the extension part 20b and is connected to the filter 23 of the sealing assembly 17 as described above. A method for connecting the first end part 20a of the positive electrode lead 20 and the exposed part 32a of the positive electrode current collector 32 and a method for connecting the second end part 20c of the positive electrode lead 20 and the sealing assembly 17 are not particularly limited as long as electrical connection is secured, and examples thereof include ultrasonic welding.

A material for the positive electrode lead 20 is not particularly limited and includes a metal such as aluminum and titanium.

The negative electrode 12 comprises a negative electrode current collector and a negative electrode active material layer formed on the negative electrode current collector. Foil of a metal stable in an electric potential range of the negative electrode such as copper, a film in which said metal is disposed on a surface layer thereof, and the like are used for the negative electrode current collector. The negative electrode active material layer includes a negative electrode active material. The negative electrode active material layer preferably includes a thickener and a binder in addition to the negative electrode active material.

As the negative electrode active material, a carbon material capable of occluding and releasing lithium ions can be used, and hardly graphitizable carbon, easily graphitizable carbon, fibrous carbon, coke, carbon black, and the like can be used besides graphite. Furthermore, silicon, tin, and an alloy and oxide mainly containing them can be used as a non-carbon-based material.

As the binder, while PTFE and the like can be used as with the case of the positive electrode, a styrene-butadiene copolymer (SBR) or a modified product thereof and the like may be used. As the thickener, carboxymethyl cellulose (CMC) and the like may be used.

The electrolyte includes a solvent and an electrolyte salt dissolved in the solvent. The electrolyte is not limited to a liquid electrolyte and may be a solid electrolyte using a gelatinous polymer and the like. The solvent is preferably a non-aqueous solvent such as carbonates, lactones, ethers, ketones, esters, and a mixed solvent of two or more kinds thereof, for example. However, the solvent may be an aqueous solvent.

As the electrolyte salt, $LiPF_6$, $LiBF_4$, $LiCF_3SO_3$, and a mixture of two or more kinds thereof can be used, for example. A dissolved amount of the electrolyte salt based on the solvent is 0.5 to 2.0 mol/L, for example.

A porous sheet having ion permeability and insulation properties is used for the separator 13, for example. Specific examples of the porous sheet include a fine porous thin film, a woven fabric, and a nonwoven fabric. As a material of the separator 13, an olefin-based resin such as polyethylene and polypropylene and cellulose are preferable. The separator 13 may be a laminated body having a cellulose fiber layer and a fiber layer of a thermoplastic resin such as an olefin-based resin. In addition, the separator 13 may be a multilayer separator including a polyethylene layer and a polypropylene layer, and a separator in which a material such as an aramid-based resin and a ceramic is applied to a surface thereof may be used.

First Embodiment

Figure 2:
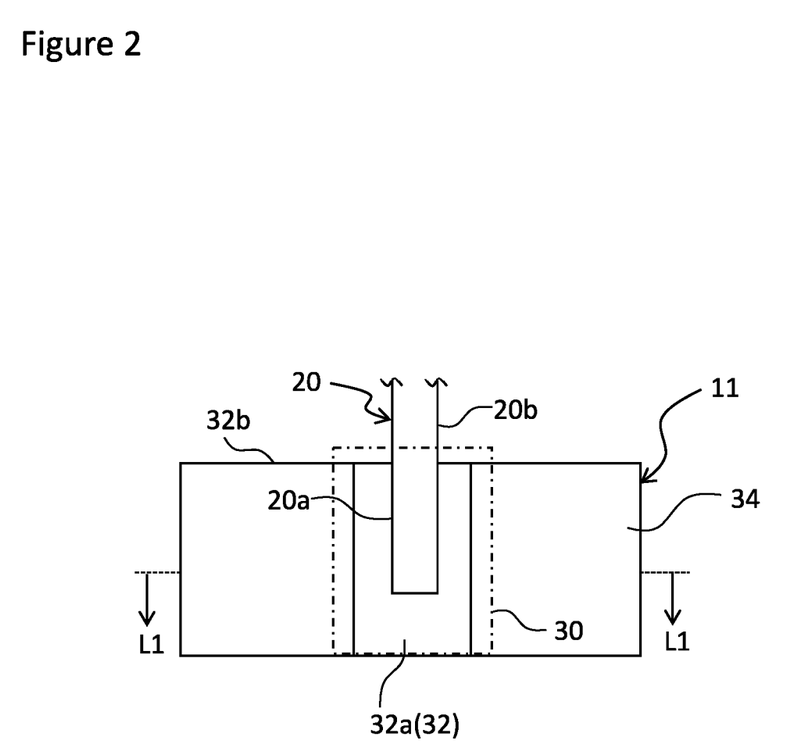
FIG. 2 is a partial top view viewed from one principal surface-side of a positive electrode.
Figure 3:
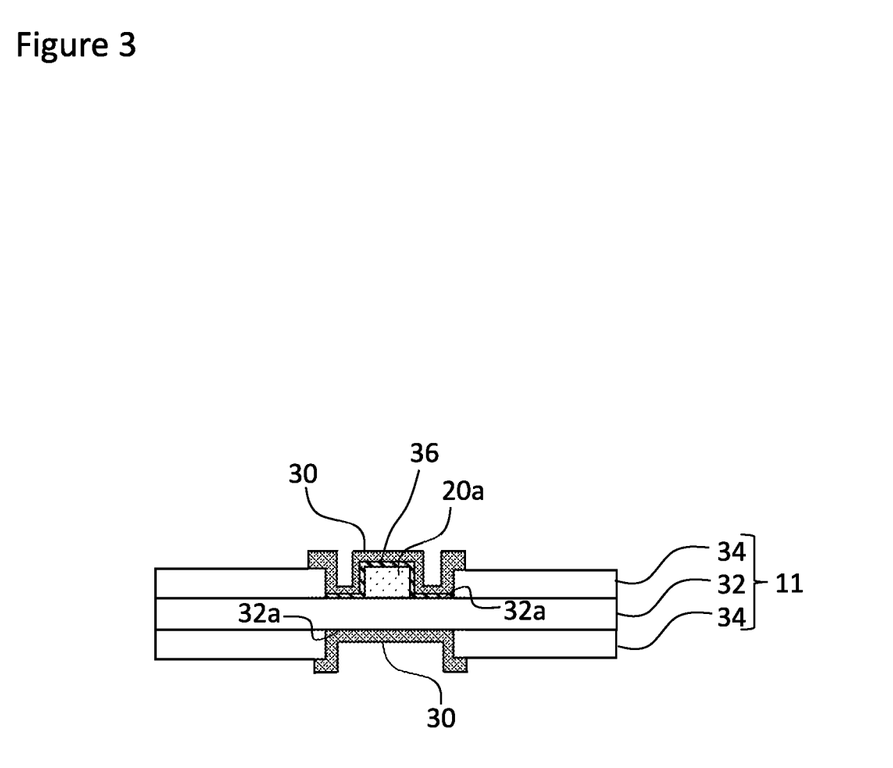
FIG. 3 is a sectional view (first embodiment) taken along the line L1-L1 in FIG. 2.

FIG. 3 is a sectional view taken along the line L1-L1 in FIG. 2. An insulating member covering a part of the positive electrode lead 20 has an insulating tape 30 and an insulating layer 36 described later.

As shown in FIG. 3, the insulating layer 36 is disposed on an outer surface of the first end part 20a of the positive electrode lead 20. In addition, the insulating layer 36 is preferably disposed on the exposed part 32a of the positive electrode current collector 32. Here, the outer surface of the first end part 20a of the positive electrode lead 20 is a surface other than the part contacting the exposed part 32a of the positive electrode current collector 32. That is, in a case where the positive electrode lead 20 has a plate shape as shown in FIG. 2, the outer surface of the first end part 20a includes one principal surface opposed to a surface contacting the exposed part 32a of the positive electrode current collector 32 and a pair of side surfaces opposed to each other. Incidentally, a shape of the positive electrode lead 20 is not limited to a plate shape and may be a columnar shape and the like.

As shown in FIG. 3, the insulating layer 36 is preferably disposed on the one principal surface and the pair of side surfaces of the first end part 20a of the positive electrode lead 20. However, the insulating layer 36 may be disposed on the entirety or a part of the outer surface of the first end part 20a of the positive electrode lead 20. That is, with respect to the positive electrode lead 20 having a plate shape, the insulating layer 36 may be disposed on a part or the entirety of the one principal surface of the first end part 20a, may be disposed on a part or the entirety of the pair of side surfaces, or may be disposed on a part or the entirety of each of the one principal surface and the pair of side surfaces of the first end part 20a. While the insulating layer 36 may be formed on a surface of the first end part 20a of the positive electrode lead 20 contacting the exposed part 32a of the positive electrode current collector 32, in this case, contact resistance at a contact between the positive electrode lead 20 and the positive electrode current collector 32 may increase, and battery performance may deteriorate. Accordingly, in the first end part 20a of the positive electrode lead 20, the insulating layer 36 is preferably not disposed on the surface contacting the exposed part 32a of the positive electrode current collector 32.

The insulating layer 36 has electrical resistance higher than that of a native oxide film naturally foamed on the positive electrode lead 20. The insulating layer 36 preferably has electrical resistance of 1 MΩ or more and more preferably has electrical resistance of 10 MΩ or more, for example.

A material of the insulating layer 36 is not particularly limited as long as the insulating layer 36 includes a material having insulation properties and the like. However, the insulating layer 36 preferably includes an inorganic material. In addition, the insulating layer 36 preferably includes a binder in terms of mechanical strength, adhesiveness, and the like of the insulating layer 36.

The inorganic material included in the insulating layer 36 includes at least one selected from the group consisting of a metal oxide, a metal hydroxide, a metal nitride, a metal fluoride, and a metal carbide, for example.

The binder included in the insulating layer 36 is preferably a substance dissolvable in a solvent such as NMP and water, for example, and chemically stable in the positive electrode. Examples thereof include polytetrafluoroethylene (PTFE), polyvinylidene difluoride (PVdF), polyacrylic acid, polyacrylonitrile, polyisobutylene, and polyisoprene.

As shown in FIG. 2 and FIG. 3, the insulating tape 30 is disposed at both of the one principal surface-side and the other principal surface-side of the positive electrode 11. However, the insulating tape 30 may be disposed at the one principal surface-side of the positive electrode 11 on which the positive electrode lead 20 is disposed. The insulating tape 30 disposed at the one principal surface-side covers the insulating layer 36 disposed on the outer surface of the first end part 20a of the positive electrode lead 20. In addition, the insulating tape 30 disposed at the one principal surface-side preferably covers the insulating layer 36 disposed on the exposed part 32a of the positive electrode current collector 32 and also covers a boundary part between the exposed part 32a and the positive electrode active material layer 34. In addition, the insulating tape 30 disposed at the other principal surface-side covers the exposed part 32a and a boundary part between the exposed part 32a and the positive electrode active material layer 34.

The insulating tape 30 includes a substrate layer and an adhesive layer on the substrate layer, for example. The substrate layer is a layer mainly containing an organic material, for example, and examples thereof include polyphenylene sulfide (PPS), polyetheretherketone (PEEK), polyimide (PI), polypropylene (PP), polyethylene terephthalate (PET), and polybutylene terephthalate (PBT). The adhesive layer is a layer adhering to the insulating layer 36, the exposed part 32a, and the like and preferably includes an adhesive such as a rubber-based resin, an acrylic resin, and a silicone-based resin, for example.

Figure 4:
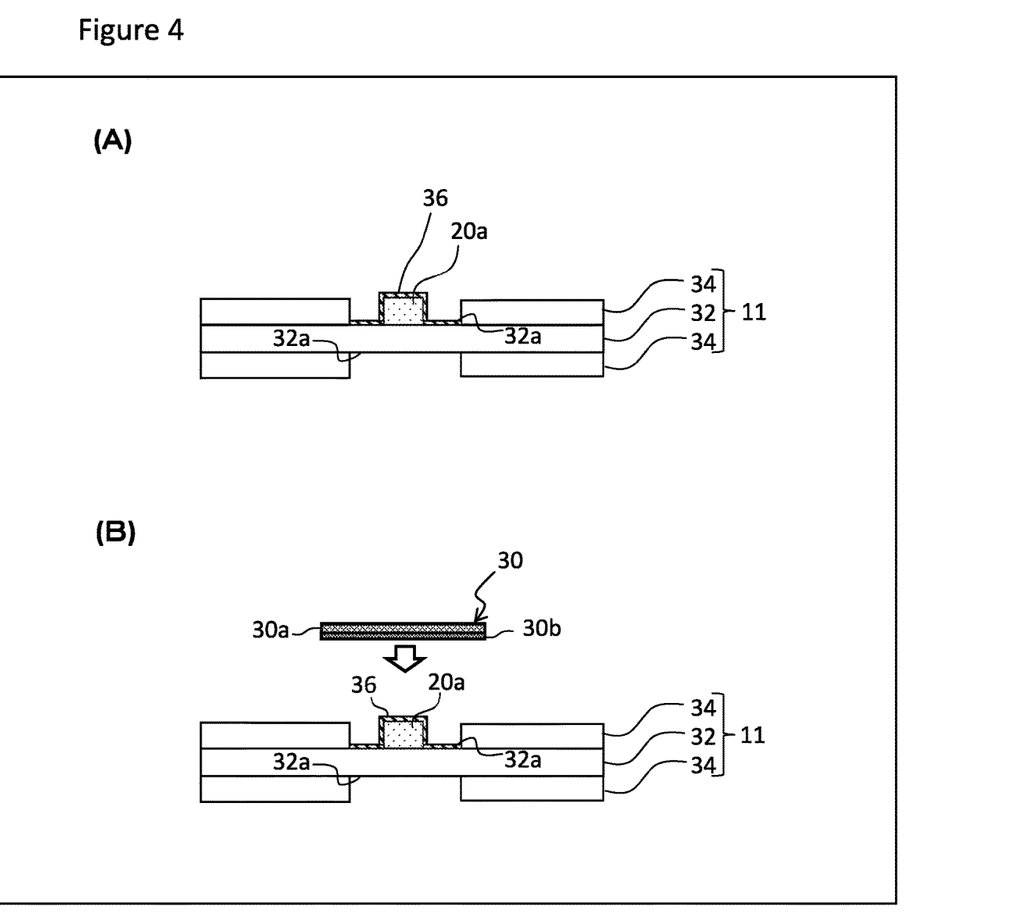
FIG. 4 is a diagram showing one example of a method for arranging an insulating layer and an insulating tape according to the first embodiment.

FIG. 4 is a diagram showing one example of a method for arranging the insulating layer and the insulating tape. First, slurry including inorganic particles, a binder, and the like is applied on the outer surface of the first end part 20a of the positive electrode lead 20 and on the exposed part 32a to dispose the insulating layer 36 on the outer surface of the first end part 20a and on the exposed part 32a (see FIG. 4(A)). Thereafter, the insulating tape 30 having the substrate layer 30a and the adhesive layer 30b on the substrate layer 30a is prepared, and the insulating tape 30 is attached on the insulating layer 36, with the adhesive layer 30b facing the insulating layer 36 (see FIG. 4(B)). The insulating layer 36 prepared according to such a procedure is in a state of adhering to the first end part 20a and the exposed part 32a.

Figure 5:
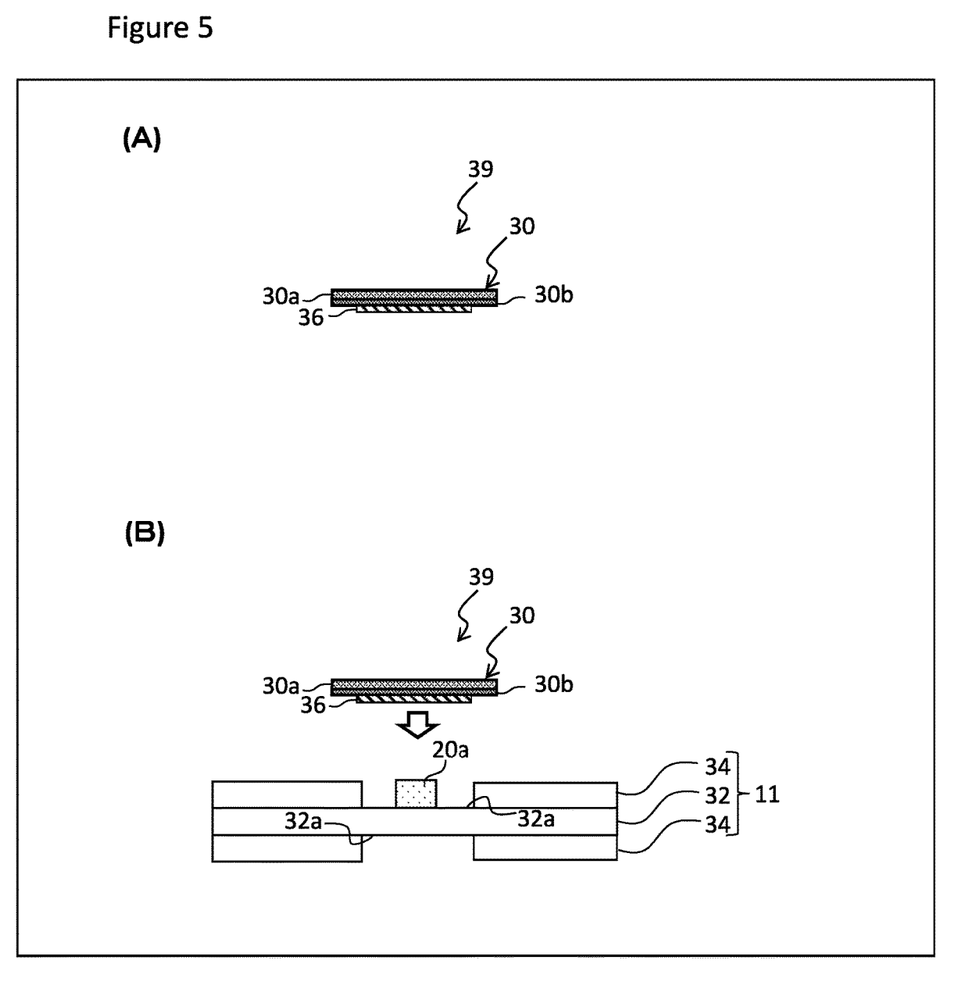
FIG. 5 is a diagram showing another example of the method for arranging the insulating layer and the insulating tape according to the first embodiment.

FIG. 5 is a diagram showing another example of the method for arranging the insulating layer and the insulating tape. First, the insulating layer 36 including inorganic particles, a binder, and the like is formed on the adhesive layer 30b of the insulating tape 30 having the substrate layer 30a and the adhesive layer 30b on the substrate layer 30a to prepare an insulating member 39. (See FIG. 5(A)). Thereafter, the insulating member 39 is attached so that the insulating layer 36 of the insulating member 39 is disposed on the outer surface of the first end part 20a and on the exposed part 32a (see FIG. 5(B)). The insulating layer 36 prepared according to such a procedure is in a state of not adhering to the first end part 20a and the exposed part 32a.

In this manner, by disposing the insulating layer 36 on the outer surface of the first end part 20a of the positive electrode lead 20 connected to the exposed part 32a of the positive electrode current collector 32 and covering the insulating layer 36 with the insulating tape 30, an internal short circuit between the positive electrode lead 20 and the negative electrode 12 is suppressed even if a foreign matter having entered a battery breaks through the insulating tape 30 and the insulating tape 30 breaks because the positive electrode lead 20 on which the insulating layer 36 is disposed is exposed. Even in a case where a foreign matter penetrates the insulating layer 36 and reaches the positive electrode lead 20 and an internal short circuit occurs between the positive electrode lead 20 and the negative electrode 12, since the insulating layer 36 existing around the foreign matter acts as a large short-circuit resistor, heat generation in the battery due to an internal short circuit is suppressed and an increase in battery temperature is suppressed.

While the insulating layer 36 may be only disposed on the outer surface of the first end part 20a of the positive electrode lead 20, the insulating layer 36 is preferably disposed on a part or the entirety of the exposed part 32a as described above. Consequently, a foreign matter having entered a battery hardly comes into contact with the exposed part 32a, and occurrence of an internal short circuit in the battery is further suppressed.

A thickness of the insulating layer 36 is preferably within a range of 2 to 30 µm, for example. By setting the thickness of the insulating layer 36 to 2 µm or more, occurrence of an internal short circuit or an increase in battery temperature, which arises when the insulating tape 30 breaks due to a foreign matter, is suppressed compared with a case where the thickness of the insulating layer 36 is less than 2 µm. An insulating layer 36 having a thickness exceeding 30 µm may require other components to have reduced volumes so as to allow the case body 16 with a predetermined size to house the electrode assembly 14.

Examples of the inorganic material in the insulating layer 36 include a metal oxide such as aluminum oxide, titanium oxide, zirconium oxide, silicon oxide, manganese oxide, magnesium oxide, and nickel oxide; a metal hydroxide such as aluminum hydroxide and magnesium hydroxide; a metal nitride such as titanium nitride, boron nitride, aluminum nitride, magnesium nitride, and silicon nitride; a metal fluoride such as aluminum fluoride, lithium fluoride, sodium fluoride, magnesium fluoride, calcium fluoride, and barium fluoride; and a metal carbide such as silicon carbide, boron carbide, titanium carbide, and tungsten carbide. The inorganic material preferably includes at least one of the group consisting of aluminum oxide, aluminum hydroxide, titanium oxide, magnesium oxide, and magnesium hydroxide in terms of chemical stability against the electrolyte and the like.

A basis weight of the inorganic material in the insulating layer 36 is preferably 0.5 to 10 mg/cm$^2$. When the basis weight of the inorganic material is 0.5 mg/cm$^2$ or more, an increase in battery temperature due to an internal short circuit is suppressed compared to a case where the basis weight of the inorganic material is less than 0.5 mg/cm$^2$. An insulating layer 36 in which a basis weight of the inorganic material exceeds 10 mg/cm$^2$ is undesirable because costs may increase.

An average particle diameter of the inorganic material is preferably within a range of 0.05 to 2.0 µm because an increase in battery temperature due to an internal short circuit can be further suppressed thereby and other reasons. Here, the average particle diameter is a volume average particle diameter measured by a laser diffraction method and means a median diameter at which a volumetric integrated value becomes 50% in a particle size distribution. The average particle diameter can be measured using a laser diffraction and scattering-type particle size distribution measuring device (manufactured by HORIBA, Ltd.), for example.

While the insulating tape 30 may only cover the insulating layer 36 disposed on the first end part 20a of the positive electrode lead 20, the insulating tape 30 preferably further covers the insulating layer 36 disposed on the exposed part 32a and more preferably covers a part or the entirety of the boundary part between the exposed part 32a and the positive electrode active material layer 34. Consequently, a foreign matter having entered a battery hardly comes into contact with the exposed part 32a or the boundary part, and occurrence of an internal short circuit in the battery is further suppressed. Furthermore, the insulating tape 30 may cover a part or the entirety of the extension part 20b of the positive electrode lead 20. Consequently, deterioration of battery performance due to contact of the positive electrode lead 20 with other members is suppressed.

A thickness of the insulating tape 30 is not particularly limited but is preferably within a range of 10 to 40 μm, for example. When the thickness of the insulating tape 30 is less than 10 μm, breakage is easily caused by a foreign matter having entered a battery. In addition, when the thickness of the insulating tape 30 exceeds 40 μm, other components may be required to have reduced volumes so that the case body 16 with a predetermined size is allowed to house the electrode assembly 14.

Example A1

As a positive electrode active material, 100 parts by weight of a lithium nickel cobalt aluminum composite oxide represented by $LiNi_{0.88}Co_{0.09}Al_{0.03}O_2$, one part by weight of acetylene black (AB), and one part by weight of polyvinylidene difluoride (PVDF) were mixed; and an appropriate amount of N-methyl-2-pyrolidone (NMP) was further added thereto to prepare positive electrode mixture slurry. Thereafter, the positive electrode mixture slurry was applied to both sides of a positive electrode current collector made from aluminum foil and dried. The resultant product was cut into a predetermined electrode size and rolled by using a roller to prepare a positive electrode with a positive electrode active material layer formed on the both sides of the positive electrode current collector. An exposed part (width: 6 mm) on which no positive electrode active material layer was formed and the positive electrode current collector was exposed was formed approximately at a central part in the longitudinal direction of the positive electrode. An aluminum positive electrode lead having a thickness of 150 μm and a width of 3.5 mm was bonded to the formed exposed part by ultrasonic welding.

Slurry in which 95 parts by weight of aluminum oxide (average particle diameter: 2 μm) and 5 parts by weight of PVDF were dispersed in NMP was applied on a PET film and dried to form an insulating layer. The basis weight of aluminum oxide in the formed insulating layer was 0.5 mg/cm².

An insulating tape in which an adhesive layer (thickness: 7 μm) made from an acrylic adhesive was formed on a substrate layer made from a polyimide film having a width of 11 mm and a thickness of 25 μm was prepared. The insulating layer formed on the PET film was attached to the adhesive layer of the insulating tape, the PET film was subsequently peeled, and the insulating layer (width: 7 mm) was transferred on the adhesive layer to prepare an insulating member.

The insulating member was attached so that the insulating layer of the insulating member was disposed on the outer surface of first end part of the positive electrode lead and on the exposed part. That is, the insulating layer disposed on the outer surface of the first end part of the positive electrode lead and on the exposed part was covered with the insulating tape.

Thereafter, a thin plate of copper foil was used as a negative electrode current collector; negative electrode mixture slurry was prepared by dispersing a graphite powder, carboxymethyl cellulose (CMC) as a thickener, and styrene-butadiene rubber (SBR) as a binder in water at a ratio of 98:1:1 in terms of respective mass ratios; the negative electrode mixture slurry was applied to both sides of the current collector and dried; and the resultant product was compressed by roll pressing so as to have a predetermined thickness. An exposed part on which no negative electrode active material layer was formed and the negative electrode current collector was exposed was formed at an end part of the negative electrode in the longitudinal direction, and a nickel negative electrode lead was bonded to the exposed part by ultrasonic welding.

Then, the negative electrode lead on the exposed part and the exposed part were covered with an insulating tape. The insulating tape was obtained by forming an adhesive layer made from a rubber-based resin on a substrate layer made from a polypropylene film having a thickness of 25 μm.

A wound-type electrode assembly was prepared by spirally winding the prepared positive electrode and negative electrode with a separator interposed therebetween. A polyethylene fine porous film with a heat resistant layer in which a filler including polyamide and alumina was dispersed formed on one surface thereof was used as the separator.

The above-described electrode assembly was housed in a bottomed cylindrical case body having an outer diameter of 18 mm and a height of 65 mm. At this time, the second end part of the positive electrode lead was welded to a sealing assembly, and the other end of the negative electrode lead was welded to the case body. Then, a non-aqueous electrolytic solution in which $LiPF_6$ was added to a mixed solvent obtained by mixing ethylene carbonate (EC), ethyl methyl carbonate (EMC), and diethyl carbonate (DEC) at a volume ratio of 3:3:4 so that a concentration of $LiPF_6$ became 1 mol/L was injected to the case body, and the opening of the case body was subsequently sealed by a gasket and the sealing assembly to prepare a 18650 cylindrical non-aqueous electrolyte secondary battery.

Example A2

A non-aqueous electrolyte secondary battery was prepared in the same manner as Example A1 except that the basis weight of aluminum oxide in the insulating layer was changed to 2.5 mg/cm².

Example A3

A non-aqueous electrolyte secondary battery was prepared in the same manner as Example A1 except that the basis weight of aluminum oxide in the insulating layer was changed to 10 mg/cm².

Example A4

A non-aqueous electrolyte secondary battery was prepared in the same manner as Example A1 except that the average particle diameter of aluminum oxide in the insulating layer was changed to 0.5 μm.

Example A5

A non-aqueous electrolyte secondary battery was prepared in the same manner as Example A1 except that the average particle diameter of aluminum oxide in the insulating layer was changed to 0.5 μm and the basis weight of aluminum oxide in the insulating layer was changed to 2.5 mg/cm².

Example A6

A non-aqueous electrolyte secondary battery was prepared in the same manner as Example A1 except that the average particle diameter of aluminum oxide in the insulating layer was changed to 0.5 μm and the basis weight of aluminum oxide in the insulating layer was changed to 10 mg/cm².

Example A7

A non-aqueous electrolyte secondary battery was prepared in the same manner as Example A1 except that the average particle diameter of aluminum oxide in the insulating layer was changed to 0.05 μm.

Example A8

A non-aqueous electrolyte secondary battery was prepared in the same manner as Example A1 except that the average particle diameter of aluminum oxide in the insulating layer was changed to 0.05 μm and the basis weight of aluminum oxide in the insulating layer was changed to 2.5 mg/cm².

Example A9

A non-aqueous electrolyte secondary battery was prepared in the same manner as Example A1 except that the average particle diameter of aluminum oxide in the insulating layer was changed to 0.05 μm and the basis weight of aluminum oxide in the insulating layer was changed to 10 mg/cm².

Example A10

An insulating layer was formed by applying slurry in which 95 parts by weight of aluminum oxide (average particle diameter: 1 μm) and 5 parts by weight of PVDF were dispersed in NMP to the outer surface of a first end part of a positive electrode lead and an exposed part and drying the slurry. The basis weight of aluminum oxide in the formed insulating layer was 1 mg/cm². An insulating tape was attached so as to cover the formed insulating layer. The insulating tape was obtained by forming an adhesive layer (thickness: 7 μm) made from an acrylic adhesive on a substrate layer made from a polyimide film having a width of 11 mm and a thickness of 25 μm.

Comparative Example 1

A non-aqueous electrolyte secondary battery was prepared in the same manner as Example A1 except that the insulating layer was not disposed on the outer surface of the first end part of the positive electrode lead and the exposed part.

Battery temperature at the time of short circuit due to a foreign matter was measured with respect to each of the non-aqueous electrolyte secondary batteries of Examples and Comparative Example. The battery temperature at the time of short circuit due to a foreign matter is the highest arrival temperature obtained by putting a foreign matter (a small nickel piece) on an insulating tape and measuring a temperature of the side surface of a battery with a thermocouple at the time of forcibly causing a short circuit according to JIS C 8714. Results of respective Examples and Comparative Example are shown in Table 1.

TABLE 1

| | Insulating layer | | | | Battery temperature at time of short circuit due to foreign matter (degree C.) |
|---|---|---|---|---|---|
| | | Inorganic material | | | |
| | Formation place | Material | Average particle diameter (um) | Basis weight (mg/cm²) | |
| Example A1 | Formed on adhesive layer | Aluminum oxide | 2 | 0.5 | 34 |
| Example A2 | | | 2 | 2.5 | 31 |
| Example A3 | | | 2 | 10 | 28 |
| Example A4 | | | 0.5 | 0.5 | 30 |
| Example A5 | | | 0.5 | 2.5 | 29 |
| Example A6 | | | 0.5 | 10 | 25 |
| Example A7 | | | 0.05 | 0.5 | 28 |
| Example A8 | | | 0.05 | 2.5 | 25 |
| Example A9 | | | 0.05 | 10 | 25 |
| Example A10 | Formed on positive electrode lead | | 1 | 2.5 | 25 |
| Comparative Example 1 | — | — | — | — | 79 |

In each of Examples A1 and A2 and Comparative Example 1, an internal short circuit due to contamination of the foreign matter occurred. However, in each of Examples A1 and A2 in which the insulating layer was disposed on the outer surface of the first end part of the positive electrode lead and the insulating layer was covered with the insulating tape, battery temperature at the time of internal short circuit significantly decreased and an increase in battery temperature was suppressed compared with Comparative Example in which no insulating layer was disposed on the outer surface of the first end part of the positive electrode lead and the insulating tape merely covered thereon. In addition, in Examples A3 to A10, an increase in battery temperature was suppressed more than Examples A1 and A2. Especially, in Examples A6, A8, A9, and A10, no internal short circuit occurred, and no increase in battery temperature was observed.

Second Embodiment

Figure 6:
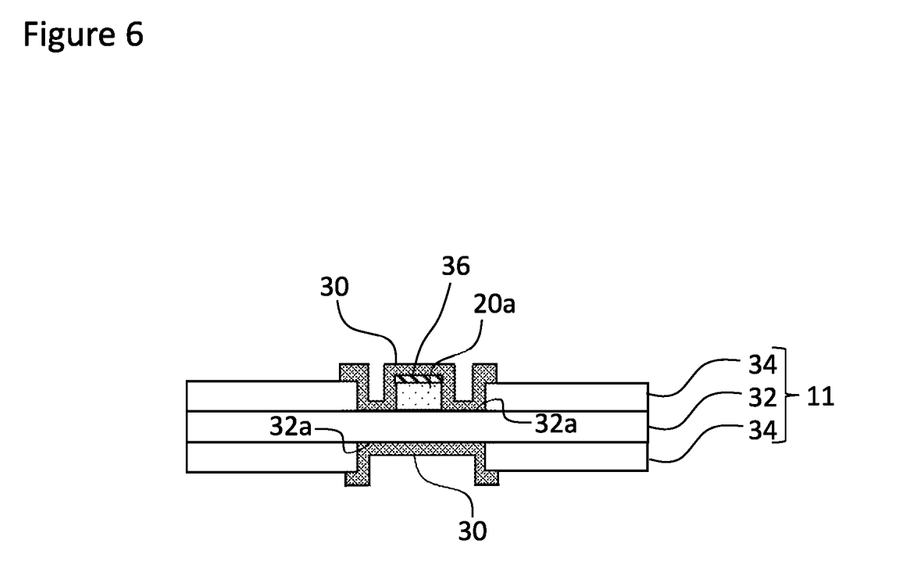
FIG. 6 is a sectional view (second embodiment) taken along the line L1-L1 in FIG. 2.

Hereinafter, a second embodiment will be described. However, description overlapping with that of the first embodiment is appropriately omitted. As shown in FIG. 6, an insulating layer 36 is formed on the outer surface of the first end part 20a of the positive electrode lead 20.

While the insulating layer 36 is formed on one principal surface of the first end part 20a of the positive electrode lead 20 in FIG. 6, its configuration is not limited thereto, and the insulating layer 36 may be formed on the entirety or a part of the outer surface of the first end part 20a of the positive electrode lead 20. That is, in a plate-shaped positive electrode lead 20, the insulating layer 36 may be formed on a part or the entirety of the one principal surface of the first end part 20a, may be formed on a part or the entirety of a pair of side surfaces, or may be formed on a part or the entirety of the one principal surface and the pair of side surfaces of the first end part 20a.

The insulating layer 36 is different from a native oxide film naturally foamed on the positive electrode lead 20 and has electrical resistance higher than that of a native oxide film. The insulating layer 36 preferably has electrical resistance of 1 MΩ or more and more preferably has electrical resistance of 10 MΩ or more, for example. While examples of the insulating layer 36 include an oxide film such as an anodized film, a phosphate film, a chromate film (chromic acid salt film), a stannate film, and a fluoride film, the insulating layer 36 is preferably an oxide film such as an anodized film or a phosphate film in terms of insulating properties, denseness, and the like.

The phosphate film is formed by immersing the positive electrode lead 20 including aluminum or an alloy mainly containing aluminum in a phosphate solution for a predetermined time, for example. The positive electrode lead 20 after being immersed in the solution is desirably subjected to drying treatment at a temperature ranging from 30° C. to 50° C., for example. A solution including phosphoric acid, chromic anhydride, and a fluoride or a solution including phosphoric acid, zinc phosphate monobasic, and a fluoride is preferably used as the phosphate solution in terms of obtaining an insulating layer 36 with higher insulation properties and denseness, and the like, for example. A phosphoric chromate film (specific compositions thereof are $Al_2O_3$, $CrPO_4$, and the like, for example) is formed by immersing the positive electrode lead 20 in a solution including phosphoric acid, chromic anhydride, and a fluoride. In addition, a zinc phosphate film (specific compositions thereof are $Zn_3(PO_4)_2$, $AlPO_4$, and the like, for example) is formed by immersing the positive electrode lead 20 in a solution including phosphoric acid, zinc phosphate monobasic, and a fluoride.

The anodized film is formed by methods defined in JIS H 9500 and JIS H 9501, for example. An anodized film (alumite) is formed by immersing the positive electrode lead 20 including aluminum or an alloy mainly containing aluminum in a 20% sulfuric acid solution followed by anodization with an applied voltage of 20 V, for example. A specific composition of the anodized film is aluminum oxide or the like, for example. The solution is not limited to sulfuric acid and may be phosphoric acid, oxalic acid, or the like, for example.

Examples of the oxide film other than the anodized film include a boehmite film, and the like. These oxide films are formed by hydrothermal treatment and the like, for example. Among the oxide films, the anodized film is preferable in terms of obtaining an oxide film with high insulation properties and denseness.

The insulating layer 36 may have a monolayer structure including the oxide film such as the anodized film, the phosphate film, or the like or may have a laminated structure in which the oxide film such as the anodized film and the phosphate film or the like are laminated.

While the insulating tape 30 shown in FIG. 2 and FIG. 6 is disposed on both of the one principal surface-side and the other principal surface-side of the positive electrode 11, the insulating tape 30 may be disposed at the one principal surface-side of the positive electrode 11 on which the positive electrode lead 20 is disposed. The insulating tape 30 disposed on the one principal surface-side covers the insulating layer 36 formed on the first end part 20a of the positive electrode lead 20, the exposed part 32a, and the boundary part between the exposed part 32a and the positive electrode active material layer 34. In addition, the insulating tape 30 disposed on the other principal surface-side covers the exposed part 32a and the boundary part between the exposed part 32a and the positive electrode active material layer 34.

The insulating tape 30 may include at least the substrate layer, and the adhesive layer is not an essential component. When an insulating tape provided with no adhesive layer is used, an adhesive may be applied to a part for attachment, and the insulating tape may be attached on, for example.

In this manner, by forming the insulating layer 36 on the outer surface of the first end part 20a of the positive electrode lead 20 connected to the exposed part 32a of the positive electrode current collector 32 and covering the insulating layer 36 with the insulating tape 30, an internal short circuit between the positive electrode lead 20 and the negative electrode 12 is suppressed even if a foreign matter having entered a battery breaks through the insulating tape 30 and the insulating tape 30 breaks because the positive electrode lead 20 on which the insulating layer 36 is formed is exposed. Even in a case where a foreign matter penetrates the insulating layer 36 and reaches the positive electrode lead 20 and an internal short circuit occurs between the positive electrode lead 20 and the negative electrode 12, since the insulating layer 36 existing around the foreign matter acts as a large short-circuit resistor, heat generation in the battery due to the internal short circuit is suppressed and an increase in battery temperature is suppressed.

While the insulating layer 36 may be formed on the outer surface of the first end part 20a of the positive electrode lead 20, the insulating layer 36 is preferably further formed on the extension part 20b of the positive electrode lead 20. Consequently, conduction between the positive electrode lead 20 and other members due to contact therebetween is suppressed, and deterioration of battery performance is suppressed. The insulating layer 36 may be formed on a part of the extension part 20b or may be formed on the entirety of the extension part 20b.

The insulating layer 36 may be formed on the second end part 20c (see FIG. 1) of the positive electrode lead 20. However, when the insulating layer 36 is formed on the second end part 20c of the positive electrode lead 20, contact resistance against the sealing assembly 17 shown in FIG. 1 increases, and battery performance may deteriorate. Accordingly, the insulating layer 36 is preferably not formed on the second end part 20c of the positive electrode lead 20.

A thickness of the insulating layer 36 is preferably within a range of 2 to 30 μm, for example. By setting the thickness of the insulating layer 36 to 2 μm or more, occurrence of an internal short circuit or an increase in battery temperature, which arises when the insulating tape 30 breaks due to a foreign matter, is suppressed compared with a case where the thickness of the insulating layer 36 is less than 2 μm. An insulating layer 36 having a thickness exceeding 30 μm is not desirable because time and costs for film formation increase.

Puncture breaking strength of the insulating layer 36 is preferably higher than puncture breaking strength of the insulating tape 30. Consequently, occurrence of an internal short circuit in a battery can be efficiently suppressed. A measurement method of puncture breaking strength will be described in the examples section.

While the insulating tape 30 may cover the insulating layer 36 formed on the first end part 20a of the positive electrode lead 20, the insulating tape 30 desirably further covers a part or the entirety of the exposed part 32a and a part or the entirety of the boundary part between the exposed part 32a and the positive electrode active material layer 34. Consequently, a foreign matter having entered a battery hardly comes into contact with the exposed part 32a or the boundary part, and occurrence of an internal short circuit in a battery is further suppressed. Furthermore, the insulating tape 30 may cover a part or the entirety of the extension part 20b of the positive electrode lead 20. Consequently, an internal short circuit due to contact of the positive electrode lead 20 with other members is suppressed.

Example B1

As a positive electrode active material, 100 parts by weight of a lithium nickel cobalt aluminum composite oxide represented by $LiNi_{0.88}Co_{0.09}Al_{0.03}O_2$, one part by weight of acetylene black (AB), and one part by weight of polyvinylidene difluoride (PVdF) were mixed; and an appropriate amount of N-methyl-2-pyrolidone (NMP) was further added thereto to prepare positive electrode mixture slurry. Thereafter, the positive electrode mixture slurry was applied to both sides of a positive electrode current collector made from aluminum foil and dried. The resultant product was cut into a predetermined electrode size and rolled by using a roller to prepare a positive electrode, with a positive electrode active material layer formed on the both sides of the positive electrode current collector. An exposed part on which no positive electrode active material layer was formed and the positive electrode current collector was exposed was formed approximately at a central part in the longitudinal direction of the positive electrode.

An aluminum positive electrode lead having a thickness of 150 μm and a width of 3.5 mm was cut to have a predetermined length. Parts of this positive electrode lead to which the exposed part of the positive electrode current collector and a sealing assembly are respectively welded were masked, and the positive electrode lead was subsequently immersed in a 20% sulfuric acid solution followed by anodization with an applied voltage of 20 V to form an anodized film having a thickness of 2 μm on the positive electrode lead.

Puncture breaking strength of the anodized film was 1 N. Puncture breaking strength of the anodized film was measured as follows. The anodized film on the positive electrode lead is pressed by a stainless-steel nail (diameter: 3 mm, tip angle: 35°), and electrical resistance between the stainless-steel nail and the positive electrode lead is measured while increasing the load of the stainless-steel nail. Then, the load applied at a time when electrical resistance indicating dielectric breakdown is observed is taken as puncture breaking strength.

A part of the positive electrode lead on which no anodized film was formed was brought into contact with the exposed part of the positive electrode current collector and bonded to the exposed part by ultrasonic welding. That is, the positive electrode lead had a first end part connected to the exposed part, an extension part extending toward an outside of a peripheral part of the positive electrode current collector, and a second end part connected to a sealing assembly at a leading end side of the extension part and became a positive electrode lead with the anodized film formed on an outer surface of the first end part and the extending part thereof.

Thereafter, a thin plate of copper foil was used as a negative electrode current collector; negative electrode mixture slurry was prepared by dispersing a graphite powder, carboxymethyl cellulose (CMC) as a thickener, and styrene-butadiene rubber (SBR) as a binder in water at a ratio of 98:1:1 in terms of respective mass ratios; the negative electrode mixture slurry was applied to both sides of the current collector and dried; and the resultant product was compressed by roll pressing so as to have a predetermined thickness. An exposed part on which no negative electrode active material layer was formed and the negative electrode current collector was exposed was formed at an end part of the negative electrode in the longitudinal direction, and a nickel negative electrode lead was bonded to the exposed part by ultrasonic welding.

The anodized film formed on an outer surface of the first end part of the positive electrode lead and the exposed part were covered with an insulating tape. With respect to the negative electrode side, the negative electrode lead on the exposed part and the exposed part were covered with the insulating tape. The insulating tape used included a substrate layer made from a polyimide film having a thickness of 25 μm and an adhesive layer made from a rubber-based resin.

Puncture breaking strength of the insulating tape was 2 N. Puncture breaking strength of the insulating tape was measured as follows. The insulating tape attached to an aluminum plate having a thickness of 150 μm is pressed by a stainless-steel nail (diameter: 3 mm, tip angle: 35°), and electrical resistance between the stainless-steel nail and the aluminum plate is measured while increasing the load of the stainless-steel nail. Then, the load applied at a time when electrical resistance indicating dielectric breakdown is observed is taken as puncture breaking strength.

A wound-type electrode assembly was prepared by spirally winding the prepared positive electrode and negative electrode with a separator interposed therebetween. A polyethylene fine porous film with a heat resistant layer in which a filler including polyamide and alumina was dispersed formed on one surface thereof was used as the separator.

The above-described electrode assembly was housed in a bottomed cylindrical case body having an outer diameter of 18 mm and a height of 65 mm. At this time, the second end part of the positive electrode lead was welded to a sealing assembly, and the other end of the negative electrode lead was welded to the case body. Then, a non-aqueous electrolytic solution in which $LiPF_6$ was added to a mixed solvent obtained by mixing ethylene carbonate (EC), ethyl methyl carbonate (EMC), and diethyl carbonate (DEC) at a volume ratio of 3:3:4 so that a concentration of $LiPF_6$ became 1 mol/L was injected to the case body, and the opening of the case body was subsequently sealed by a gasket and the sealing assembly to prepare a 18650 cylindrical non-aqueous electrolyte secondary battery.

Example B2

A non-aqueous electrolyte secondary battery was prepared in the same manner as Example B1 except that an anodized film having a thickness of 10 μm was formed on the positive electrode lead by adjusting the electric quantity during anodization treatment. Puncture breaking strength of the anodized film was 2 N.

Example B3

A non-aqueous electrolyte secondary battery was prepared in the same manner as Example B1 except that an anodized film having a thickness of 15 μm was formed on the positive electrode lead by adjusting the electric quantity during anodization treatment. Puncture breaking strength of the anodized film was 2.7 N.

Example B4

A non-aqueous electrolyte secondary battery was prepared in the same manner as Example B1 except that an anodized film having a thickness of 20 μm was formed on the positive electrode lead by adjusting the electric quantity during anodization treatment. Puncture breaking strength of the anodized film was 3.1 N.

Example B5

A non-aqueous electrolyte secondary battery was prepared in the same manner as Example B1 except that an anodized film having a thickness of 25 μm was formed on the positive electrode lead by adjusting the electric quantity during anodization treatment. Puncture breaking strength of the anodized film was 3.5 N.

Example B6

A non-aqueous electrolyte secondary battery was prepared in the same manner as Example B1 except that an anodized film having a thickness of 30 μm was formed on the positive electrode lead by adjusting the electric quantity during anodization treatment. Puncture breaking strength of the anodized film was 3.7 N.

Comparative Example 2

A non-aqueous electrolyte secondary battery was prepared in the same manner as Example B1 except that no anodized film was formed on the positive electrode lead.

Battery temperature at the time of short circuit due to a foreign matter was measured with respect to each of the non-aqueous electrolyte secondary batteries of Examples and Comparative Example. The battery temperature at the time of short circuit due to a foreign matter is the highest arrival temperature obtained by putting a foreign matter (a small nickel piece) on an insulating tape and measuring a temperature of the side surface of a battery with a thermocouple at the time of forcibly causing a short circuit according to JIS C 8714. Results of respective Examples and Comparative Example are shown in Table 2.

TABLE 2

| | Anodized film | | Battery temperature at time of short circuit due to foreign matter (degree C.) |
|---|---|---|---|
| | Thickness (um) | Puncture breaking strength (N) | |
| Example B1 | 2 | 1 | 34 |
| Example B2 | 10 | 2 | 31 |
| Example B3 | 15 | 2.7 | 25 |
| Example B4 | 20 | 3.1 | 25 |
| Example B5 | 25 | 3.5 | 25 |
| Example B6 | 30 | 3.7 | 25 |
| Comparative Example | — | — | 84 |

In each of Examples B1 and B2 and Comparative Example 2, an internal short circuit due to contamination of the foreign matter occurred. However, in each of Examples B1 and B2 in which the insulating film was formed on the outer surface of the first end part of the positive electrode lead and the insulating film thereof was covered with the insulating tape, battery temperature at the time of internal short circuit significantly decreased and an increase in battery temperature was suppressed compared with Comparative Example 2 in which no insulating film was formed on the outer surface of the first end part of the positive electrode lead and the insulating tape merely covered thereon. In addition, in each of Examples B3 to B6 in which puncture breaking strength of the insulating film formed on the outer surface of the first end part of the positive electrode lead was higher than puncture breaking strength of the insulating tape, no internal short circuit occurred, and no increase in battery temperature was observed.

REFERENCE SIGNS LIST 10 secondary battery
11 positive electrode
12 negative electrode
13 separator
14 electrode assembly
15 battery case
16 case body
17 sealing assembly
18,19 insulating plate
20 positive electrode lead
20a first end part
20b extension part
20c second end part
21 negative electrode lead
22 projecting portion
23 filter
24 lower vent member
25 insulating member
26 upper vent member
27 cap
28 gasket
30 insulating tape
30a substrate layer
30b adhesive layer
32 positive electrode current collector
32a exposed part
32b peripheral part
34 positive electrode active material layer
36 insulating layer
39 insulating member

The invention claimed is:

1. A secondary battery, comprising:
a positive electrode;
a negative electrode;
a battery case housing the positive electrode and the negative electrode;
a positive electrode lead electrically connected to the positive electrode; and
an insulating tape covering a part of the positive electrode lead, wherein
the positive electrode has a positive electrode current collector and a positive electrode active material layer formed on the positive electrode current collector,
the positive electrode current collector has, at a longitudinally central part of the positive electrode active material layer on the positive electrode current collector, an exposed part on which no positive electrode active material layer is formed,
the positive electrode lead has a first end part connected to the exposed part and an extension part extending from the first end part toward an outside of a peripheral part of the positive electrode current collector,
an insulating layer is disposed on an outer surface of the first end part of the positive electrode lead,
the insulating layer is covered with an insulating tape, and
the insulating tape covers a boundary part between the exposed part and the positive electrode active material layer,
wherein the insulating layer includes an inorganic material,
a basis weight of the inorganic material in the insulating layer is within a range of 0.5 to 10 mg/cm², and
the insulating layer disposed on the outer surface of the first end part is unbonded to the first end part.

2. The secondary battery according to claim 1, wherein the insulating layer is disposed on the outer surface of the first end part of the positive electrode lead and on the exposed part.

3. The secondary battery according to claim 1, wherein the first end part has a plate shape,
the outer surface of the first end part has one principal surface opposed to a surface on which the first end part contacts the exposed part and a pair of side surfaces, and
the insulating layer is disposed on the one principal surface and the pair of side surfaces.

4. The secondary battery according to claim 1, wherein an average particle diameter of the inorganic material is within a range of 0.05 to 2.0 µm.

5. The secondary battery according to claim 1, wherein the insulating layer includes a binder.

6. The secondary battery according to claim 1, wherein the inorganic material includes at least one of the group consisting of aluminum oxide, aluminum hydroxide, titanium oxide, magnesium oxide, and magnesium hydroxide.

7. The secondary battery according to claim 1, wherein
the battery case comprises a case body having an opening and a sealing assembly sealing the opening,
the positive electrode lead has a second end part connected to the battery case in a leading end side of the extension part,
the second end part of the positive electrode lead is connected to the sealing assembly, and
no insulating layer is formed on the second end part.

8. The secondary battery according to claim 1, wherein
the insulating layer is at least one of the group consisting of an oxide film and a phosphate film, and
puncture breaking strength of the insulating layer is 1 N or more and 3.7 N or less.

9. The secondary battery according to claim 8, wherein
the positive electrode lead includes aluminum or an alloy mainly containing aluminum, and
the oxide film includes an anodized film.

10. The secondary battery according to claim 8, wherein the phosphate film includes a phosphoric chromate film or a zinc phosphate film.

11. The secondary battery according to claim 8, wherein a thickness of the insulating layer is within a range of 2 to 30 µm.

12. The secondary battery according to claim 1, wherein puncture breaking strength of the insulating layer is higher than puncture breaking strength of the insulating tape.

13. The secondary battery according to claim 1, further comprising a wound-type electrode assembly in which the positive electrode and the negative electrode are wound with a separator interposed therebetween, wherein
the positive electrode active material layer, the positive electrode lead, and the insulating tape are disposed opposed to the negative electrode with the separator interposed therebetween, and
the insulating layer is disposed opposed to the negative electrode with the insulating tape and the separator interposed therebetween.

14. The secondary battery according to claim 1, wherein the insulating layer has electrical resistance of 1 MΩ or more.

15. The secondary battery according to claim 1, wherein the insulating tape extends across the boundary part between the exposed part and the positive electrode active material layer, and
the insulating layer includes a portion thereof in direct contact with the exposed part while separate from the outer surface of the first end part, and does not extend across the boundary part between the exposed part and the positive electrode active material layer.

16. A secondary battery, comprising:
a positive electrode;
a negative electrode;
a battery case housing the positive electrode and the negative electrode;
a positive electrode lead electrically connected to the positive electrode; and
an insulating tape covering a part of the positive electrode lead, wherein
the positive electrode has a positive electrode current collector and a positive electrode active material layer formed on the positive electrode current collector,
the positive electrode current collector has, at a longitudinally central part of the positive electrode active material layer on the positive electrode current collector, an exposed part on which no positive electrode active material layer is formed,
the positive electrode lead has a first end part connected to the exposed part and an extension part extending from the first end part toward an outside of a peripheral part of the positive electrode current collector,
an insulating layer is disposed on an outer surface of the first end part of the positive electrode lead,
the insulating layer is covered with an insulating tape,
the insulating tape extends across a boundary part between the exposed part and the positive electrode active material layer, and
the insulating layer includes a portion thereof in direct contact with the exposed part while separate from the outer surface of the first end part, and does not extend across the boundary part between the exposed part and the positive electrode active material layer.

17. The secondary battery according to claim 16, wherein the insulating layer disposed on the outer surface of the first end part is bonded to the first end part.

* * * * *